Figure 1:
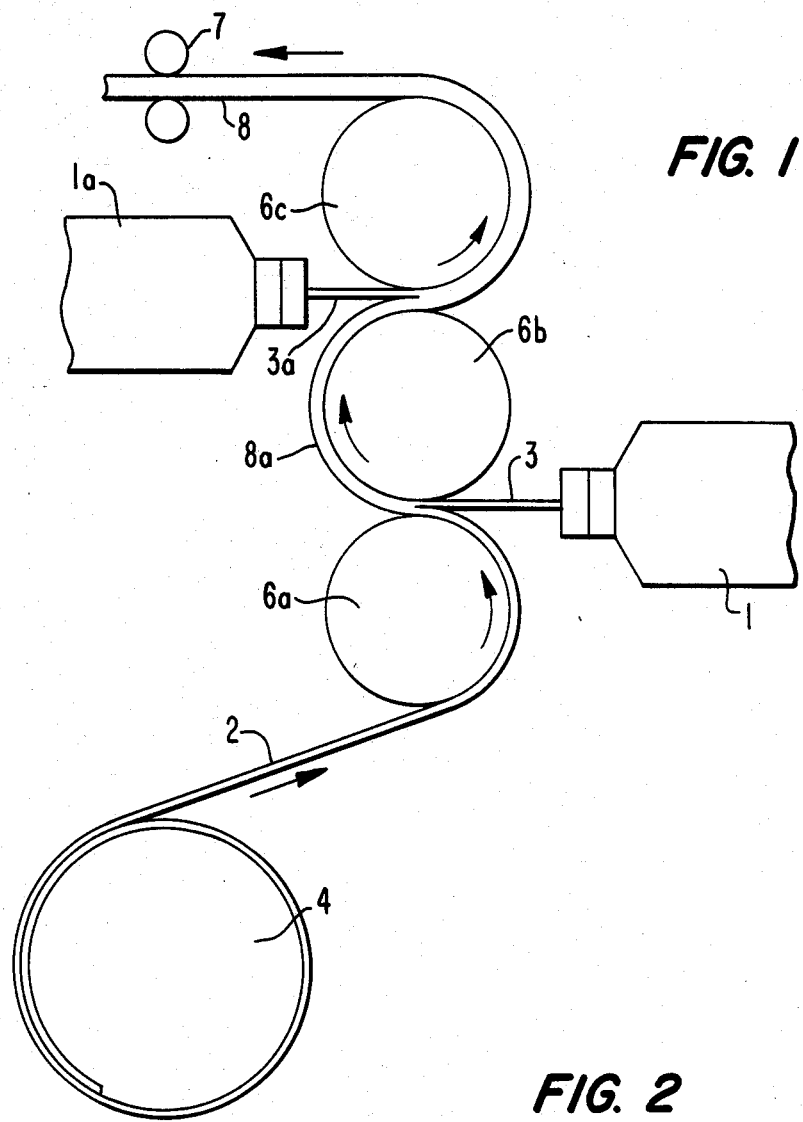

United States Patent [19]

Spielau et al.

[11] Patent Number: 4,652,326

[45] Date of Patent: Mar. 24, 1987

[54] PROCESS FOR THE PRODUCTION OF SEMIFINISHED PRODUCTS AND/OR MOLDED COMPONENTS FROM POLYPROPYLENE

[75] Inventors: Paul Spielau, Troisdorf-Eschmar; Werner Kühnel, Neunkirchen-Schöneshof; Karlo Klaar, Niederkassel-Mondorf; Bertram Gaspar, Troisdorf-Spich; Richard Weiss, Troisdorf; Horst Ulb, Troisdorf-Sieglar; Hans-Ulrich Breitscheidel, Siegburg; Gerd Klingberg, Lohmar-1 Heide; Jürgen Fenske, Leverkusen, all of Fed. Rep. of Germany

[73] Assignee: Dynamit Nobel Aktiengesellschaft, Troisdorf, Fed. Rep. of Germany

[21] Appl. No.: 635,929

[22] Filed: Jul. 30, 1984

[30] Foreign Application Priority Data

Jul. 28, 1983 [DE] Fed. Rep. of Germany ....... 3327149

[51] Int. Cl.⁴ ...................... B29C 39/14; B29C 39/22
[52] U.S. Cl. ........................... 156/244.11; 156/244.27; 427/209; 525/288; 525/342
[58] Field of Search ............................... 525/288, 342; 156/244.27, 244.11

[56] References Cited

U.S. PATENT DOCUMENTS

| | | | |
|---|---|---|---|
| 3,830,872 | 8/1974 | Schrage et al. | 525/288 |
| 4,032,592 | 6/1977 | Ogihara et al. | 525/288 |
| 4,117,195 | 9/1978 | Swarbrick et al. | 525/288 |
| 4,237,334 | 12/1980 | Kojima et al. | 156/244.11 |
| 4,395,459 | 7/1983 | Herschdorfer et al. | 156/244.11 |
| 4,407,690 | 10/1983 | White | 156/244.27 |

Primary Examiner—Wilbert J. Briggs, Sr.
Attorney, Agent, or Firm—Antonelli, Terry & Wands

[57] ABSTRACT

A process for the production of semifinished products and/or molded components from polypropylene by grafting thereto an alkoxysilane compound in the presence of an organic peroxide involves mising the polypropylene, the silane compound, and the peroxide and subsequently plasticizing and extruding at a temperature of about 170°–240° C. The process utilizes an essentially isotactic homopolymer of propylene with a density of about 0.90–0.91 g/cm$^3$ and a melt index MFI (#° C./5 kp) of smaller than 0.7 g/10 min, preferably smaller than 0.1 g/10 min, and with a molecular weight higher than 5·10$^5$. An initially non-crosslinked semifinished product is obtained.

9 Claims, 2 Drawing Figures

PROCESS FOR THE PRODUCTION OF SEMIFINISHED PRODUCTS AND/OR MOLDED COMPONENTS FROM POLYPROPYLENE

This invention relates to a process for the production of semifinished products and/or molded components from a polypropylene modified by grafting thereto an alkoxysilane compound in the presence of an organic peroxide, which process comprises mixing the polypropylene, the silane compound, and the peroxide, and subsequently plasticizing and extruding the resulting admixture at a temperature of 170°–240° C.

It is known to graft polyolefins with the use of silane compounds in the presence of organic peroxides; for example, note U.S. Pat. No. 3,075,948 which includes examples for polyethylene. Crosslinking of polyethylene or ethylene-olefin copolymers with the use of silane compounds in the presence of organic peroxides and silanol condensation catalysts is described in detail also, for example, in DAS No. 1,794,028, DAS No. 1,963,571 and DOS No. 3,210,192.

These processes are based on the premise that the crosslinking reaction takes place in two stages, so that the polyethylene, if desired, can be stored in a form ready for crosslinking before the actual crosslinking step is subsequently performed.

It is known that polypropylene is very sensitive to thermal stress since it contains tertiary carbon atoms in the polymer chain, and thus is readily degraded. In particular, polypropylene cannot be readily crosslinked by means of peroxides since, as contrasted to polyethylene, chain splitting greatly predominates over chain combination in polypropylene and, thus, degradation results; i.e., a reduction in molecular weight.

Consequently, the processes for producing silane-modified, crosslinked polyethylenes cannot be readily applied to polypropylene. European Laid-Open Application No. 0 004 034 describes a process for the production of crosslinked, silane-modified polypropylenes and copolymers of propylene according to which the process must be performed under exclusion of oxygen during plasticizing and molding, and only special peroxides, not promoting degradation of polypropylene, are utilized, and the crosslinking reaction of the grafted-on silane compounds takes place in the presence of a silanol condensation catalyst in water. According to European Laid-Open Application No. 0 004 034, polypropylenes are employed having an MFI larger than 1; i.e., medium- and low-molecular polypropylenes having a molecular weight of, at most, up to $4 \times 10^5$; in this connection, only dibenzoyl peroxide or tert-butyl perbenzoate are considered suitable as peroxides, since these peroxides exhibit a relatively low decomposition temperature; whereas, for example, dicumyl peroxide, promoting the termal degradation of polypropylene, is not indicated as suitable for silane modification of polypropylene.

DOS No. 2,409,237 discloses a homo-or copolymer of propylene silane-modified in the presence of peroxides, press-molded with the use of pressure and heat as an adhesive layer between metallic panels. Here again, medium- and low-molecular polymers of propylene having an MFI larger than 0.8 up to 9 and more are utilized, which apparently can be readily grafted and can also be extruded to thin coating films.

This invention is based on the object of providing a crosslinked semifinished product and/or molded component based on polypropylene, as an inexpensive mass-produced plastic with low specific gravity and good resistance to chemicals and heat. Crosslinking is to vary the spectrum of properties in a controlled fashion; especially, the heat deflection temperature and cold impact resistance are to be increased. Based on the possibility of grafting polyolefins by means of silane compounds in the presence of organic peroxides and crosslinking same by means of silanol condensation catalysts in the presence of water, the object resides in producing, in a first process step, a semifinished product based on polypropylene, which is as yet non-crosslinked or only slightly (i.e., partially) crosslinked, so that the product can be still further processed and optionally shaped before complete crosslinking occurs. An already entirely crosslinked semifinished product can no longer be shaped, or can be shaped only to a minor extent, and presents considerable difficulties during processing. Another object of the invention is to provide a crosslinked molded component based on polypropylene which is reinforced by means of flat textile materials that are incorporated by laminating or are laminated thereon. Such layered materials likewise can no longer be shaped in the completely crosslinked condition, since these layered materials then tend very readily to undergo delamination.

Non-crosslinked polypropylene, reinforced with fillers or glass mats, has been disclosed, for example, in "Plastverarbeiter" (Plastics Processor) 29th year, 1978, No. 7, pages 351–360, and "Zeitschrift Kunststoffe" (Plastics Periodical) 66 (1976), No. 12, pages 793–797.

The object of this invention has been achieved in a process of grafting an alkoxysilane onto polypropylene in the presence of an organic peroxide by using an essentially isotactic homopolymer of propylene with a density of 0.90–0.91 g/cm$^3$ and a melt index MFI (190° C./5 kp) of smaller than 0.7 g/10 min, preferably smaller than 0.1 g/10 min and a molecular weight of larger than $5 \times 10^5$. The high-molecular, partially crystalline polypropylenes, containing minimal atactic proportions, as per this invention, are relatively rigid. Also their MFI's (230° C./2.15 kp) are smaller than 0.7 and smaller than 0.1 g/10 min, respectively. The MFI value is obtained according to DIN 53735 resp. ASTM 1268-62 T.

These high-molecular polypropylenes are degraded in a controlled fashion along the lines of this invention by the use of organic peroxides having a one-minute half-life temperature of about 160°–240° C., such as, in particular, dicumyl peroxide, tert-butylcumyl peroxide, bis(tert-butylperoxy)isopropylbenzene, or 4,4-di-tert-butylperoxy-n-butyl valerate, added in amounts of 0.1–0.8%, based on the weight of the quantity of polypropylene used, so that the high-molecular polypropylene becomes somewhat softer. Thus, according to this invention, a certain degradation of the polypropylene is purposely brought about by the peroxide.

However, at the same time, the polypropylene is again built up by grafting of the silane compound.

When conducting the process of this invention, several reactions take place in parallel during the first stage, since, on account of the peroxide compound producing free radicals, the customary crosslinking of polypropylene proceeding by way of free radicals as well as the chain splitting reaction are performed, and grafting of the activated polypropylene with the silane component is likewise effected. The small amount of initial crosslinking of the extrudate is due to the peroxide-caused polypropylene crosslinking but, according to this invention, this process is controlled by using quantities and a selected peroxide in such a way that the initial crosslinking does not impair a subsequent shaping processing of the extruded semifinished product. Only in the second process stage is the thus optionally slightly (i.e., partially) crosslinked polypropylene finished with respect to crosslinking by hydrolysis of the silane compound grafted on the polypropylene, this hydrolysis effecting a condensation reaction for chemical crosslinking of the silane. This second crosslinking stage is dependent on the time; it can be accelerated, on the one hand, by raising the temperature and/or adding moisture, but on the other hand, can also be attained over relatively long periods of time by storage in a normal atmosphere after shaping.

The components and conditions selected according to this invention lead to an extrudate which is practically still non-crosslinked and distinguished by an MFI (230° C./2.16 kp) of 25–70, preferably 30–60 g/10 min. It has been found that this extrudate is excellently suited for reinforcement with flat textile materials. Since it is not as crosslinked, flat textile materials, such as glass fiber mats, fleeces, woven fabrics, can be perfectly penetrated; i.e., without air bubble formation, on account of the flow characteristic of this extrudate.

Thereafter, this reinforced and still non-crosslinked semifinished article can be additionally passed on to processing and shaping into molded components; the article is completely crosslinked during or after such operation.

Besides the selected homopolymers of propylene, small amounts of propylene copolymers or block copolymers can also be added up to about 10%, based on the weight of the polymer; the MFI of the extrudate, according to this invention, must be maintained.

In order to produce the propylene to be crosslinked, in accordance with this invention, an alkoxysilane compound of the formula:

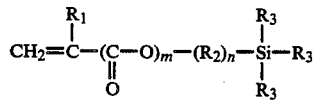

wherein $R_1$ is hydrogen or an alkyl radical of 1–4 carbon atoms, $R_2$ is a straight-chain alkylene radical of 1–10 carbon atoms, $R_3$ is an alkoxy radical of 1–5 carbon atoms which is interrupted optionally by an oxygen atom, and m and n equal 0 or 1; is utilized in an amount of 1.0–5%, based on the weight of the quantity of polypropylene employed. Preferably, the silane compounds to be selected from this group are to have a boiling point of higher than 150° C. so that the silane cannot be volatilized in noticeable amounts during plasticizing of the polypropylene. Especially suitable silane compounds are γ-methacryloxypropyltrimethoxysilane, boiling point 225° C. at 760 torr, vinyltris-β-methoxyethoxysilane, 285° C., and vinyltriethoxysilane, 161° C. Also vinyltrimethoxysilane, 120° C., can be readily grafted to polypropylene, but it has a low boiling point so that danger of volatilizing exists during the incorporation and plasticizing process at high temperatures.

The compounds and process conditions selected in accordance with the invention, make it possible to produce the extrudate with a degree of initial crosslinking of below 20%, preferably below 5%, by extrusion and plasticizing of the mixture, the extrudate thereafter attaining a degree of crosslinking that is by at least 40% higher by final crosslinking during storage after 4–6 weeks optionally in a humid atmosphere and/or by shaping with the use of heat and pressure. It has been found, surprisingly, that it is possible, using the mixture proposed by this invention, to manufacture non-crosslinked extrudate, or an extrudate with only slight crosslinking as a semifinished article in the form of sheets or profiled members which article can be stored at least for several days in a normal atmosphere at room temperature without being completely crosslinked. During this condition, the article can be passed on to a shaping process, the semifinished article, shaped into the molded component, then being entirely crosslinked during or after this step. This procedure provides a great advance in the art, since the essentially non-crosslinked semifinished product, manufactured in a first process step, need not be immediately further processed but, rather, retains satisfactory moldability and processability even after a brief, unproblematic intermediate storage period, and can be passed on to further shaping with the use of pressure and/or heat, the actual crosslinking taking place only during this final shaping step or thereafter. If the semifinished product were to be entirely crosslinked directly during or directly after extrusion, it could no longer be subjected to further shaping. The molded components produced according to this invention, in contrast thereto, exhibit, besides a high heat deflection temperature, also improved properties, for example, with respect to the cold impact resistance, as compared with non-crosslinked molded parts and semifinished articles. Moreover, it is also possible to store the almost non-crosslinked semifinished product manufactured according to this invention in an air- and moisture-tight packaging before further processing and final crosslinking.

In the process of this invention, other conventional additives can also be introduced into the mixture, such as for example, antioxidants, blowing agents, mold release agents, fillers such as talc, calcium carbonate, carbon black, UV stabilizers, and stabilizers against heavy-metal-catalyst decomposition, colorants, or the like. The use of stabilizers is especially important since thermal degradation of the polypropylene is confined within limits and a higher processing temperature is made possible. The higher the processing temperature, the more extensive is the grafting of the polypropylene, and the higher will be the final degree of crosslinking attainable.

In particular when adding fillers, care must be taken in conducting the process of this invention that such fillers are very dry; i.e., the degree of moisture must be reduced as far as possible by drying either the filler or the premix of polypropylene and filler. Also glass fibers can be incorporated into the mixture in amounts of about 10–50%, based on the weight of the quantity of polypropylene employed. Fillers can be added in an amount of about 5 to 50% based on the weight of the quantity of polypropylene.

According to the process of this invention, a silanol condensation catalyst, if it is supplied at all, is incorporated directly in the first process step during plasticizing of the polypropylene. Preferred amounts of silanol condensation catalysts are 0 to 0.1 parts by weight referring to 100 parts by weight of polypropylene. In this connection, attention must be given to the directive that all components of the mixture are to be utilized in the dry state; i.e., in the water-free state. However, it has been found that it is possible according to the process of this invention, to attain subsequent high crosslinking, i.e., a high degree of crosslinking of the extrudate, even without the use of silanol condensation catalyst, either by storage under selected conditions or by additional treatment with heat, pressure and/or moisture.

Known silanol condensation catalysts are salts of carboxylic acids, such as dibutyltin dilaurate, tin acetate, tin(II) octanoate, lead naphthenate, zinc caprylate, iron(II) ethylhexanoate, and organometallic compounds including titanic acid esters or chelate compounds of titanic acid, such as tetrabutyl titanate, tetranonyl titanate, organic bases, such as ethylamine, hexylamine, dibutylamine, and pyridine, including inorganic acids and organic acids such as fatty acids. The preferred silanol condensation catalysts are, however, organotin compounds, such as dibutyltin dilaurate, dibutyltin diacetate, and dibutyltin dioctanoate. According to the invention, only very small amounts, if any, of silanol condensation catalyst are added. The process of this invention for the production of crosslinked molded components is based, with respect to the actual manufacturing technique employed therefor, on the assumption that the humidity normally present in the atmosphere is sufficient for effecting the crosslinking reaction for silane linkage and final crosslinking of the molded components. In this connection, it is quite readily possible to provide a final crosslinking period of several weeks for the finished molded article, unless the latter is utilized immediately, directly after manufacture. In this way, there is no necessity in the process of this invention for the provision of devices for accelerating the crosslinking reaction in hot water or in a steam atmosphere to which the molded components are exposed.

A preferred composition of the mixture for producing crosslinked molded components according to the invention is one wherein the mixture contains, per 100 parts by weight of polypropylene with an MFI (190° C./5 kp) of smaller than 0.1 g/10 min, 0.2 to 0.5 parts by weight of dicumyl peroxide, 0.2 to 0.5 parts by weight of dicumyl peroxide, 1.5 to 3.5 parts by weight of a silane having a boiling point at 760 torr of higher than 150° C., e.g., γ-methacryloxypropyltrimethoxysilane, and 0 to 0.1 part by weight of a silanol condensation catalyst; e.g., dibutyltin dilaurate or dibutyltin diacetate. This composition is distinguished by good moldability and processability of the extrudate prior to final crosslinking.

When using relatively small amounts of a silanol condensation catalyst, the amounts of peroxide required can be reduced while yet attaining adequate final crosslinking of the molded component within a practically feasible time period, the initial crosslinking of the extruded semifinished product, made in the first process step, being so minor that subsequent molding, for example, vacuum deep drawing, is not impeded and the improved heat deflection temperature of the crosslinked molded component is achieved.

The polypropylene molded article crosslinked by silane linkages, as produced with the aid of the process of this invention, has excellent properties, such as reduced permanent elongation percentage, high stress crack resistance, improved heat deflection temperature and cold impact resistance.

A preferred object of this invention is the provision of reinforced, crosslinked polypropylene molded articles exhibiting high heat deflection temperatures, high bending resistance, and good cold impact resistance. According to the invention, the provision is made in this connection to extrude the extrudate in a roll nip to which is fed from one or both sides a textile flat material, and the material is penetrated by the extrudate on one or both sides to provide a reinforced sheet. Preferred flat textile materials are glass fiber mats, nonwovens, woven fabrics, or the like, with a weight per unit area of about 20-1, 200 g/m$^2$. In order to embed these glass fiber mats or the like entirely in the thermoplastic composition of the extrudate, good penetrating capacity of the extruded modified polypropylene is required. This is attained by an extrudate having an MFI (230° C./2.16 kp) of 25-70, preferably 30-60 g/10 min. By the silane modification and the use of the peroxides, it is made possible, according to this invention, to render the high-molecular polypropylene somewhat softer and suitable for the manufacture of the reinforced semifinished products according to the process of this invention. The highest bending strengths of the reinforced extrudates or molded components are obtained by embedding the flat textile materials, such as glass fiber mats, along the two outer surfaces of the extruded sheets or panels. It is also possible to embed a flat textile material only in the center of the sheet, which is achieved by applying a further extrudate to the surface of the flat textile material lying on the outside, by means of an additional roll nip.

In accordance with this invention, the process conditions during penetration of the flat textile materials, such as, for example, glass fiber mats, by the extrudate are to be chosen so that the initial degree of crosslinking of the extrudate is not increased. This means, in particular, that the temperatures of the extrudate after leaving the extruder should not be increased. The thus-produced, reinforced extrudate or semifinished product, which is practically still non-crosslinked, can then be subjected to further shaping for molded parts, such as pressing, deep drawing, vacuum forming, drape forming, or the like, or processing such as punching, bending, perforating, or thelike. The final crosslinking of the semifinished product then takes place either during molding, or alternatively, also by storage. The final crosslinking can be accelerated by moisture and a temperature increase. It can be advantageous, for example, to moisten the initially crosslinked semifinished product prior to shaping in a water bath and then mold the product so that final crosslinking is initiated with acceleration during the molding step with the use of pressure and heat and takes place during this step. The degree of crosslinking of the extrudate attainable is dependent on the degree of silane grafting and the grafting, in turn, also depends on the residence time during plasticizing and extrusion in the presence of the organic peroxide. With the use of the process of this invention, without addition of silanol condensation catalysts, final degrees of crosslinking are attained of 50% to 80% and, with addition of silanol condensation catalysts, crosslinking of 60-90%, depending on the composition.

The addition of antioxidants in amounts of 0.1 to 1.0%, based on the weight of the quantity of polypropylene utilized, is advantageous; for example, the addition of sterically hindered phenols which increase heat stability and, in this way, facilitate production of molded components under reheating without becoming tacky. It is advantageous to manufacture the molded parts from the extrudates at maximally high temperatures by press-molding, since this permits good mold release as well as the production of complicated parts, as required, for example, in the automobile construction for body parts or the like with high degrees of deformation.

The final degree of crosslinking of the components produced according to this invention, is also dependent on the amount of grafted-on silane. The higher the processing temperature during plasticizing of the polypropylene, the greater the amount of silane compound grafted onto the polypropylene, and correspondingly the higher is the degree of final crosslinking achieved subsequently. Also, the degree of grafting is the higher, the longer the residence time during plasticising; i.e., in the extruder.

The degree of crosslinking is determined by the indication of the percentage of matter insoluble in "Decalin"; i.e., by heating for 20 hours in boiling "Decalin" under reflux, the content (i.e., the percentage by weight) of insoluble gel of the crosslinked material is determined.

According to the invention, crosslinked molded components are proposed, made of a molded extrudate of an essentially isotactic homopolymer of propylene grafted with an alkoxysilane compound in the presence of an organic peroxide, this homopolymer of propylene having a density of 0.90–0.91 g/cm$^3$ and an MFI (190° C./5 kp) of smaller than 0.7, preferably 0.1 g/10 min, and a molecular weight of higher than $5 \times 10^5$, containing a flat textile material laminated on one side and/or on both sides and/or being completely embedded therein, especially on glass fiber basis. The crosslinked semifinished product or the crosslinked molded components of this invention can be utilized with advantage as building parts in apparatus construction, machine construction, automobile construction, airplane construction, etc., on account of their heat deflection temperature resisting, for example, the heat of engines and exhaust gases, and on account of their light weight, especially with glass fiber reinforcement.

It is also possible to form the crosslinkable mixtures of this invention in the first plasticizing step directly to a finished product, for example, an injection-molded part, which is only initially crosslinked during finishing production and is further crosslinked during a storage period under normal conditions, reaching the desired final degree of crosslinking after about 6–8 weeks.

The invention will be explained below with reference to several examples. The procedure used in the examples was as follows:

As the starting material, polypropylene in powder or granule form is blended in the cold state with peroxide, silane, and optionally silanol condensation catalyst as well as stabilizers, antioxidants, and usual auxiliary agents. In case fillers are provided, the fillers are first processed together with the polypropylene into granules and dried; then, this premix is combined with the peroxide, the silane, and the silanol condensation catalyst and optionally further auxiliary agents. This mixture is thereafter extruded into a sheet in an extruder, the outlet temperature of the extrudate from the extruder being about 220° C. The degree of crosslinking; i.e., the initial crosslinking of the extrudate directly after extrusion is determined on the first day and then the degrees of crosslinking attainable are determined after several days of storage in normal atmosphere or with additional moisture and raised temperature and/or after another shaping step with the use of pressure and heat.

EXAMPLES 1 TO 6

A mixture was prepared in a powder mixer with rotor at about 25° C. from the formulations indicated in Table I to which antioxidants were furthermore added in the usual amount, VTMO designating vinyltrimethoxysilane, MEMO designating γ-methacryloxypropyltrimethoxysilane, DCP designating dicumyl peroxide, and DBTL designating dibutyltin dilaurate. This mixture was then plasticized in a single-screw extruder, leaving the extruder die at a temperature of about 220° C. in band form with a width of 40 mm and a thickness of 2 mm. Thereafter, the degree of crosslinking of the freshly extruded band was determined, and this determination was also carried out after storage in a room atmosphere and optionally after treatment and storage in hot water. A comparison of Examples 1 and 2 shows that the use of a silane compound having a higher boiling point—MEMO has a boiling point of 255° C. at 760 torr—has a positive effect on a higher final crosslinking since apparently, when using VTMO having a boiling point of 120° C. at 760 torr, a relatively large proportion of VTMO is lost due to volatilization. In this way, according to Example 1, the degree of grafting and, thus, also the subsequently attainable degree of crosslinking of the silane compound is not so high.

Example 5 demonstrates that amounts of silane that are too small do not lead to a sufficiently high final degree of crosslinking.

In Examples 3 and 4, the effect of the addition of silanol condensation catalyst is demonstrated, showing that by adding silanol condensation catalyst, the crosslinking during storage at room temperature proceeds more rapidly in case of higher proportions of silanol condensation catalyst; this also holds true for Example 6 with a stabilizer based on a phenolic antioxidant, acting as the silanol condensation catalyst.

All of the semifinished products manufactured according to Examples 1–4 can still be further processed in a very satisfactory way within a more or less long time period after manufacture of the semifinished product, for example by deep drawing or press-molding with the use of pressure and heat to obtain molded articles. The further crosslinking up to final crosslinking is normally initiated and accomplished by the temperatures utilized during molding. Use of high proportions of silanol condensation catalyst of above 0.05% by weight based on polypropylene is to be recommended only for those semifinished products and/or extrudates which are not subject to any further processing or molding in addition thereto, before being passed on to final usage, inasmuch as such proportions normally cause increased initial crosslinking obstructing any processing or shaping to be conducted thereafter.

TABLE I

| Examples | 1 | 2 | 3 | 4 | 5 | 6 |
|---|---|---|---|---|---|---|
| Propylene-Homopolymer Parts by Weight MFI (190/5) 0.1 g/10 min | 100 | 100 | 100 | 100 | 100 | 100 |
| VTMO, Parts by Weight | 2 |  | 2 | 2 |  | 2 |
| MEMO, Parts by Weight |  | 2 |  |  | 0.5 |  |

TABLE I-continued

| Examples | 1 | 2 | 3 | 4 | 5 | 6 |
|---|---|---|---|---|---|---|
| DCP, 95%, Parts by Weight | 0.4 | 0.4 | 0.4 | 0.4 | 0.4 | 0.4 |
| DBTL, Parts by Weight | | | 0.05 | 0.1 | 0.05 | |
| "Irgastab" 2002, *Parts by Weight | | | | | | 0.05 |
| Degree of Crosslinking, % | | | | | | |
| 1st Day | 0 | <1 | <1 | 0 | <1 | 0 |
| 7th Day | | | | 8 | | 0 |
| 48th Day | 1 | | 50 | 80 | | <1 |
| After 3 Days of Storage in Hot Water of 95° C. | 55 | 94 | 60 | | 20 | 80 |

*Irgastab 2002 ® CIBA GEIGY, i.e. Nickelcomplex of organic phosphonic acid ester

EXAMPLES 7 TO 11

As described in Examples 1–6, ribbons were extruded from the formulations listed in Table II, and the degree of crosslinking was determined after extrusion and storage. Various peroxides were used in Examples 7 to 11. The formulations with DCP showed satisfactory extrusion characteristic; i.e., perfect plasticizing and extrusion, see, inter alia, Examples 1–6 and Examples 7, 8, 11. DCP has a one-minute half-life temperature of 180° C., peroxide A has one of 160° C., peroxide D has one of 185° C. The mixtures according to Examples 9 and 10 were hard to extrude; i.e., the extruder had a substantially higher electric current consumption; this was due to the peroxides used, having a lower one-minute half-life decomposition temperature, in case of peroxide B, 130° C.; in case of peroxide C, 110° C. These peroxides are unsuitable for use in the process of this invention with high-molecular propylene homopolymers since they do not effect a suitable degradation of polypropylene along the lines of this invention.

TABLE II

| Examples | 7 | 8 | 9 | 10 | 11 |
|---|---|---|---|---|---|
| Propylene-Homopolymer Parts by Weight MFI (190/5) <0.1 g/10 min. | 100 | 100 | 100 | 100 | 100 |
| VTMO | 2 | | 2 | 2 | 2 |
| DBTL | 0.05 | | 0.05 | 0.05 | 0.05 |
| MEMO | | 2 | | | |
| Peroxide A (1) | 0.4 | 0.4 | | | |
| Peroxide B (2) | | | 0.8 | | |
| Peroxide C (3) | | | | 0.8 | |
| Peroxide D (4) | | | | | 1.0 |
| Degree of Crosslinking, % | | | | | |
| 1st Day | <1 | <1 | 2 | 1 | 2 |
| 2 Days Storage Hot Water, 95° C. | 62 | 90 | 87 | 47 | 75 |

(1) Peroxide A = tert-Butylperoxy(3,5,5-trimethyl)hexanoate
(2) Peroxide B = Dibenzoyl peroxide 50%
(3) Peroxide C = Bis(2,4-dichlorobenzyl)peroxide 50%
(4) Peroxide D = Bis(tert-butylperoxy)isopropylbenzene

EXAMPLES 12 TO 15

Examples 12 to 15 and 3 according to Table III, produced in the manner according to the preceding examples, show the behavior of polypropylene in dependence on the melt flow index MFI. A very high melt flow index leads neither to initial crosslinking nor to adequate silane grafting, so that even with the use of a silanol condensation catalyst, no sufficient final crosslinking degree of above 40 or more percent is attained.

Example 13 shows the characteristic of a propylene copolymer showing a relatively high peroxidic initial crosslinking, but with a low degree of final crosslinking, accompanied by an only low degree of silane grafting attainable.

TABLE III

| Examples | 12 | 13 | 14 | 15 | 3 |
|---|---|---|---|---|---|
| Propylene-Homopolymer Parts by Weight MFI (190/5) 0.6 g/10 min | 100 | | | | 100 MFI (10.0/5) <0.1 g/10 min |
| Polypropylene Block Copolymer Parts by Weight MFI (190/5) 5 g/10 min | | 100 | | | |
| Propylene-Homopolymer Parts by Weight MFI (190/5) 3 g/10 min | | | 100 | | |
| Propylene-Homopolymer Parts by Weight MFI (190/5) 55 g/10 min | | | | 100 | |
| DCP, 95% Parts by Weight | 0.4 | 0.4 | 0.4 | 0.4 | 0.4 |
| DBTL, Parts by Wt. | 0.05 | 0.05 | 0.05 | 0.05 | 0.05 |
| MEMO, Parts by Wt. | 2.0 | | | | |
| VTMO, Parts by Wt. | | 2.0 | 2.0 | 2.0 | 2.0 |
| Degree of Crosslinking, % | | | | | |
| 1st Day | 2 | 14 | <1 | <1 | <1 |
| 3 Days Storage Hot Water, 95° C. | 57 | 29 | 12 | <1 | 60 |

EXAMPLES 16 TO 18

In case of Examples 16 to 18, the polypropylene-H powder was premixed with the filler and dried, then further processed as in the preceding examples. It is found that the process of this invention for the production of silane-crosslinked polypropylene molded components can also be applied to filled polypropylene.

TABLE IV

| Example | 16 | 17 | 18 |
|---|---|---|---|
| Propylene-Homopolymer Parts by Weight MFI (190/5) <0.1 g/10 min | 100 | 100 | 100 |
| VTMO, Parts by Wt. | 2 | 2 | 2 |
| DCP, 95%, Parts by Wt. | 0.4 | 0.4 | 0.4 |
| DBTL, Parts by Wt. | 0.05 | 0.05 | 0.05 |
| "Corax" N 550 FEF (1) Parts by Weight | 20 | | |
| "Sillitin" Z82 (2) Parts by Weight | | 20 | |
| "Albogel" 10 (3) | | | 20 |
| Degree of Crosslinking, % | | | |
| 1st Day | 0 | 0 | 0 |
| 2 Days Storage | 69 | 70 | 64 |

TABLE IV-continued

| Example | 16 | 17 | 18 |
|---|---|---|---|
| Hot Water, 95° C. | | | |

Figure 2:
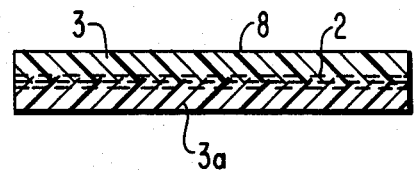

(1) "Sillitin" Z82 is siliceous chalk (Hoffmann)
(2) "Albogel" 10 is chalk (Albogelwerke, Graz)
(3) "Corax" N 550 FEF is carbon black The process of the invention for forming a reinforced article will be further understood from the accompanying drawings wherein:

FIG. 1 shows schematically an apparatus for carrying out an advantageous process for producing an endless extrudate reinforced with fibrous mats, in the still non-crosslinked condition; and FIG. 2 shows a cross-sectional view of the reinforced product obtained by the process illustrated in FIG. 1.

In the drawings, in order to produce a reinforced sheet 8 with a completely embedded fibrous mat, two extruders 1 and 1a are provided for extruding sheet-like extrudates 3, 3a, preferably of the same thickness, and a three-roll calender with rolls 6a, 6b, and 6c is likewise provided. The endless fibrous mat 2, for example, a glass fiber mat with a weight per unit area of 800 g/m² is taken off a storage reel 4 and introduced via the roll 6a into the roll nip formed between the roll 6a and the roll 6b, the sheet-shaped extrudate 3 likewise entering this nip. The extrudate 3 is still plastic and has such a viscosity, in correspondence with the set melt flow index, that it penetrates very well into the glass fiber mat 2 and saturates same completely without air bubbles. This penetrating step is further enhanced by the relatively large looping angle with which the extrudate is guided about the roll 6b. In the roll nip formed between the rolls 6b and 6c, a second sheet 3a of extrudate is applied to the outside surface of the glass fiber mat 2 and bonded to the sheet 8a. The thus-produced reinforced sheet 8 is then guided over the roll 6c and taken off by means of the take-off rollers 7.

It is also possible to introduce into a roll nip formed between two rolls a fibrous mat from both sides and to feed the sheet-shaped extrudate in the still plastic condition centrally into the roll nip. In order to increase and prolong the contact pressure to be exerted, the rolls can pertain to a twin-belt press so that perfect penetration of the extrudate into the glass fiber mats can take place, while passing through the twin-belt press, between the belts over a relatively long route.

The semifinished product reinforced in this way, as illustrated in FIG. 2, in the form of the reinforced sheet 8, is practically still non-crosslinked and can be very readily molded in this condition. It will be seen that the extrudates penetrate into the glass fiber mat to provide excellent bonding between the mat and the thermoplastic silane-grated polypropylene. Once the product is then crosslinked during or after the molding step, a high heat deflection temperature is attained, and the shape of the molded article, obtained in the non-crosslinked condition, is retained. Such a crosslinked reinforced molded component exhibits improved heat deflection temperature as compared with a non-crosslinked molded component produced from a normal polypropylene. In case of a non-crosslinked, reinforced polypropylene molded part, the polypropylene becomes soft under the effect of a temperature in the proximity of the crystallite melting point of polypropylene, whereby the internal molding stresses are released and the reinforcement; for example, a glass fiber mat, swells and is urged out of the softened thermoplastic. Advantageously, reinforced sheets 8 are manufactured having a glass fiber content of about 25–45% by weight, based on the extrudate. With higher glass fiber contents, the moldability is impaired on account of higher rigidity.

What is claimed is:

1. A process for the production of semifinished crosslinkable products from silane-grafted polypropylene which comprises blending polypropylene, an alkoxysilane of the formula:

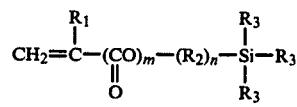

wherein $R_1$ is hydrogen or an alkyl radical of 1–4 carbon atoms, $R_2$ is a straight-chain alkylene radical of 1–10 carbon atoms, $R_3$ is an alkoxy radical of 1–5 carbon atoms and m and n each are an integral that equals 0 or 1 and an organic peroxide together to form a mixture containing 1.0 to 5% of the alkoxysilane compound and 0.1 to 0.8% of the organic peroxide based on the weight of the amount of polypropylene, plasticizing and extruding the mixture from a die extruder at a temperature of about 170°–240° C. to produce a crosslinkable, non-crosslinked or partially crosslinked extrudate of polypropylene having the alkoxysilane compound grafted thereto and directing the extrudate into a roll nip supplied from one or both sides with a flat textile material capable of being penetrated by said extrudate; the flat textile material being penetrated on one or both sides by the extrudate to form a reinforced sheet and penetration of the flat textile material with the extrudate being conducted under process conditions which do not increase the initial degree of crosslinking of the extrudate; said polypropylene comprising an essentially isotactic homopolymer of propylene with a density of about 0.90–0.91 g/cm³ and a melt index MFI (190° C./5 kp) of smaller than 0.7 g/10 min.

2. A process according to claim 1, which further comprises producing another extrudate from said mixture and applying said another extrudate to the outside surface of the flat textile material of the reinforced sheet via another roll nip.

3. A process according to claim 1, wherein said flat textile material comprises a glass fiber mat, fleece, or woven fabric, with a weight per unit area of about 20–1,200 g/m².

4. A process according to claim 2, wherein said flat textile material comprises a glass fiber mat, fleece, or woven fabric, with a weight per unit area of about 20–1,200 g/m².

5. A process according to claim 1, wherein said organic peroxide is a peroxide with a one minute, half-life temperature of about 160°–240° C.

6. A process according to claim 1, which further comprises adding up to 0.1% of a silanol condensation catalyst, based on the weight of the amount of polypropylene to said mixture prior to plasticization and extrusion.

7. A process according to claim 1, wherein the extrudate is produced with an initial degree of crosslinking of below 20%.

8. A process according to claim 1, wherein the extrudate has an MFI (230° C./2.1 kp) of 25–70.

9. A process according to claim 1, wherein a mixture containing, per 100 parts by weight of polypropylene with an MFI (190° C./5 kp) of smaller than 0.1 g/10 min., 0.2 to 0.5 parts by weight of an organic peroxide, 1.5 to 3.5 parts by weight of a alkoxysilane compound having a boiling point at 760 torr of higher than 150° C., and 0.1 part by weight of a silanol condensation catalyst is extruded at a temperature of 190°–220° C. to produce an extrudate having an initial degree of crosslinking of below 5%.

* * * * *